(12) United States Patent
Bihari et al.

(10) Patent No.: US 7,699,033 B2
(45) Date of Patent: Apr. 20, 2010

(54) METHOD AND SYSTEM TO DISTRIBUTE HIGH-ENERGY PULSES TO MULTIPLE CHANNELS

(75) Inventors: Bipin Bihari, Woodridge, IL (US); Sreenath Borra Gupta, Naperville, IL (US); Ramanujam Raj Sekar, Naperville, IL (US)

(73) Assignee: UChicago Argonne, LLC, Chicago, IL (US)

( * ) Notice: Subject to any disclaimer, the term of this patent is extended or adjusted under 35 U.S.C. 154(b) by 321 days.

(21) Appl. No.: 11/945,714

(22) Filed: Nov. 27, 2007

(65) Prior Publication Data
US 2009/0133654 A1    May 28, 2009

(51) Int. Cl.
  *F02B 1/02*    (2006.01)
(52) U.S. Cl. ............................. 123/143 B; 123/143 R
(58) Field of Classification Search ............. 123/143 B, 123/613, 143 R, DIG. 9; 385/25, 88, 147, 385/12, 18; 356/318, 28, 317
See application file for complete search history.

(56) References Cited

U.S. PATENT DOCUMENTS

| 5,568,801 | A  | 10/1996 | Paterson et al. |
| 5,587,630 | A  | 12/1996 | Dooley |
| 5,983,871 | A  | 11/1999 | Gordon et al. |
| 6,796,278 | B2 | 9/2004  | Ryan, III |
| 7,114,858 | B2 | 10/2006 | Gupta et al. |
| 2003/0136366 | A1 | 7/2003 | Herdin et al. |
| 2005/0063646 | A1* | 3/2005 | Gupta et al. ................. 385/88 |
| 2006/0032471 | A1 | 2/2006 | Yalin et al. |
| 2006/0037572 | A1 | 2/2006 | Yalin et al. |
| 2006/0055925 | A1 | 3/2006 | Yalin et al. |
| 2006/0206255 | A1* | 9/2006 | Olcmen et al. ............. 701/114 |
| 2007/0000465 | A1 | 1/2007 | Scarisbrick et al. |

OTHER PUBLICATIONS

Bipin Bihari, Sreenath B. Gupta, Raj R. Sekar, Jess Gingrich and Jack Smith, Development of Advanced Laser Ignition System for Stationary Natural Gas Reciprocating Engines, ASME, ICEF 2005-1325.
Gregory M. Klett, Sreenath Gupta, Bipin Bihari, and Raj Sekar, "Ignition Characteristics of Methane-air Mixtures at Elevated Temperatures and Pressures", ASME, ICEF 2005-1064.
Sreenath B. Gupta, Bipin Bihari, and Raj R. Sekar, Zhiyue Xu, Keng Leong, and Claude B. Reed, "Laser Based Ignition of Natural Gas-Air Mixtures", ASME, ICES2003-656.

* cited by examiner

*Primary Examiner*—Mahmoud Gimie
(74) *Attorney, Agent, or Firm*—Joan Pennington (57) ABSTRACT

A method and system to distribute high-power laser pulses to create sparks in individual cylinders of a multi-cylinder engine are provided. A laser provides laser output pulses. A distributor includes a linear array of mirrors with a respective mirror associated with one of the laser plugs. Each mirror is operatively controlled to move into a laser beam path to direct individual laser output pulses the associated laser plug for providing spark generation. The system enables correct cylinder firing order for predefined multi-cylinder firing sequences and allows for individual cylinder timing variation.

19 Claims, 6 Drawing Sheets

METHOD AND SYSTEM TO DISTRIBUTE HIGH-ENERGY PULSES TO MULTIPLE CHANNELS

CONTRACTUAL ORIGIN OF THE INVENTION

The United States Government has rights in this invention pursuant to Contract No. W-31-109-ENG-38 between the United States Government and The University of Chicago and/or pursuant to Contract No. DE-AC02-06CH11357 between the United States Government and UChicago Argonne, LLC representing Argonne National Laboratory.

FIELD OF THE INVENTION

The present invention relates to a method and distribution system for high power lasers, and more particularly to a method and system to distribute high-power laser pulses to create sparks in individual cylinders of a multi-cylinder engine, such as a stationary natural gas engine.

DESCRIPTION OF THE RELATED ART

Stationary natural gas multi-cylinder engines are currently used for power generation and pumping applications. Natural gas engines are preferred over diesel engines because they are environmentally cleaner than diesel, and in certain locations, such as natural gas fields, natural gas is more readily available than diesel fuel.

Performance and emissions targets for natural gas fired reciprocating engines currently continue to be increased. A way to meet these goals is to extend the operation of modern lean-burn natural gas engines to even leaner operation. In this situation, the intake air pressure needs to be increased to offset the reduced specific power. Lean operation, along with high intake air pressure, results in very high charge densities at the time of ignition resulting in an insulating effect across the spark plug electrodes. This often leads to increased misfiring with subsequent loss of fuel efficiency and increased unburned HC emissions.

To offset these problems, a laser-based ignition system for natural gas reciprocating engines has been proposed. Laser ignition is one such technology that enables combustion of extremely lean fuel-air mixtures that are at pressures high enough to be deemed not ignitable by conventional coil based ignition systems. Such ability enhances fuel conversion efficiencies as well as helps reduce pollutant emissions.

A comparison of emissions and performance of a 1-cylinder research engine with laser ignition with a standard Capacitance Discharge Ignition (CDI) system shows a clear advantage of the laser ignition system, primarily in a reduction of $NO_x$ emissions of up to 70%. The problem is how to provide laser ignition to a multi-cylinder IC engine, since such a system needs to accommodate typical multi-cylinder firing sequences, in addition to individually adjust spark timing in the individual cylinders. Such a system also needs to be cost effective, durable and capable of handling laser fluencies in excess of $MW/cm^2$.

Several systems to accomplish laser ignition in a multi-cylinder engines, which can be mechanical, electro-mechanical, or electro-optical, have been proposed. In one a rotating mirror that is synchronized with the crank-shaft/fly-wheel directs each pulse to the corresponding fiber-coupling port. Alternatively, a transmissive prism can be rotated and refocused into a circular fiber array. The problem with such systems using rotating mirrors or prisms is that adjustment of individual cylinder timing variation is not possible. A similar approach is based on a galvanometer where a scanning mirror points the laser beam to optical fibers arranged in an arc. Those using galvanometers have limited long-term durability. Schemes using pockels cells are of high cost and poor durability.

U.S. Pat. No. 7,114,858 issued Oct. 3, 2006 to Sreenath B. Gupta, Ramanujam Raj Sekar, and Gregory E. Hillman discloses a laser based ignition system for stationary natural gas engines, a distributor system for use with high-powered lasers, and a method of determining a successful ignition event in a laser-based ignition system. The laser based ignition (LBI) system for stationary natural gas engines includes a high power pulsed laser providing a pulsed emission output coupled to a plurality of laser plugs directly or via guiding medium such as optical fibers. A respective one of the plurality of laser plugs is provided in an engine cylinder. The laser plug focuses the coherent emission from the pulsed laser to a tiny volume or focal spot and a high electric field gradient at the focal spot leads to photoionization of the combustible mixture resulting in ignition. The laser plug allows operation at high in-cylinder pressures and includes a sapphire lens sandwiched between a top member and a bottom member. A fiber delivery system includes a plurality of optical fibers coupled between a rotating mirror distributor and respective laser plugs for transmission of the pulsed laser beam output to laser plugs.

While U.S. Pat. No. 7,114,858 provided significant improvements over the prior art, a need exists for an improved method and system to distribute high-power laser pulses to create sparks in individual cylinders of a multi-cylinder engine.

A need exists for an effective laser-based mechanism to provide successful ignition of mixtures at high pressures, leading to reduced misfire, and consequently improved fuel efficiency and lower unburned HC emissions. This also would lead to lower maintenance since the requirement to maintain a proper spark gap is eliminated, and location of the ignition kernel away from the cylinder walls, thereby enhancing overall efficiency due to reduced heat loss in the cylinder head.

Principal aspects of the present invention are to provide a method and system to distribute high-power laser pulses to create sparks in individual cylinders of a multi-cylinder engine.

Other important aspects of the present invention are to provide such a method and system to distribute high-power laser pulses to create sparks in individual cylinders of a multi-cylinder engine, substantially without negative effect and that overcome some of the disadvantages of prior art arrangements.

SUMMARY OF THE INVENTION

In brief, a method and system to distribute high-power laser pulses to create sparks in individual cylinders of a multi-cylinder engine are provided. A laser provides laser output pulses. A distributor distributes individual laser output pulses to a plurality of laser plugs for providing spark generation. Each laser plug of the plurality of laser plugs is installed in a respective individual cylinder. An electronic interface coupled to an electronic control unit (ECU) provides control signals to the distributor for enabling correct spark timing. The distributor includes a linear array of mirrors with a respective mirror associated with one of the laser plugs. Each mirror is operatively controlled to direct individual laser output pulses to the associated laser plug, for example, directly or via fiber optics.

In accordance with features of the invention, the distributor is capable of handling laser fluencies greater than 1 MW/cm$^2$, and is generally durable and vibration insensitive having generally low-cost and a time response smaller than 7 ms.

In accordance with features of the invention, each of the mirrors is held by an arm connected to a rotary actuator. In the OFF state the mirrors are positioned out of the path of the laser beam. When a particular mirror is activated or provided in the ON state, the mirror is moved into the path of the laser beam to deflect the laser output pulses, for example, by approximate 90 degrees, to be incident on the associated laser plug installed in the cylinder head or coupled to an optical fiber that delivers the output pulses to the associated laser plug.

In accordance with features of the invention, a dichroic beam splitter is positioned in the laser beam to transmit the laser radiation while it reflects radiation at substantially all other wavelengths. A significant portion of the white light that results due to spark creation is collected by the sapphire lens of the laser plug and is collimated. The collimated beam in turn is routed by the mirror and dichroic onto a short response photo diode, such as a 1 ns response photo diode. To improve the detection efficiency of the photo diode to spark emission while minimizing the response to residual laser emission, the collimated beam is routed through a set of optical filters and a positive lens, such as a set of magenta optical filters and a positive lens.

In accordance with features of the invention, the system accommodates predefined multi-cylinder firing sequences, for example, with the multi-cylinder engine including 6-cylinders having a firing sequence 1-5-3-6-2-4.

In accordance with features of the invention, a magnetic pickup couples signals from a timing disk to the electronic control unit (ECU) enabling correct spark timing to individually adjust spark timing in the individual cylinders, for example, to individually adjust spark timing in individual cylinders by ±6 crank angle degrees.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1:
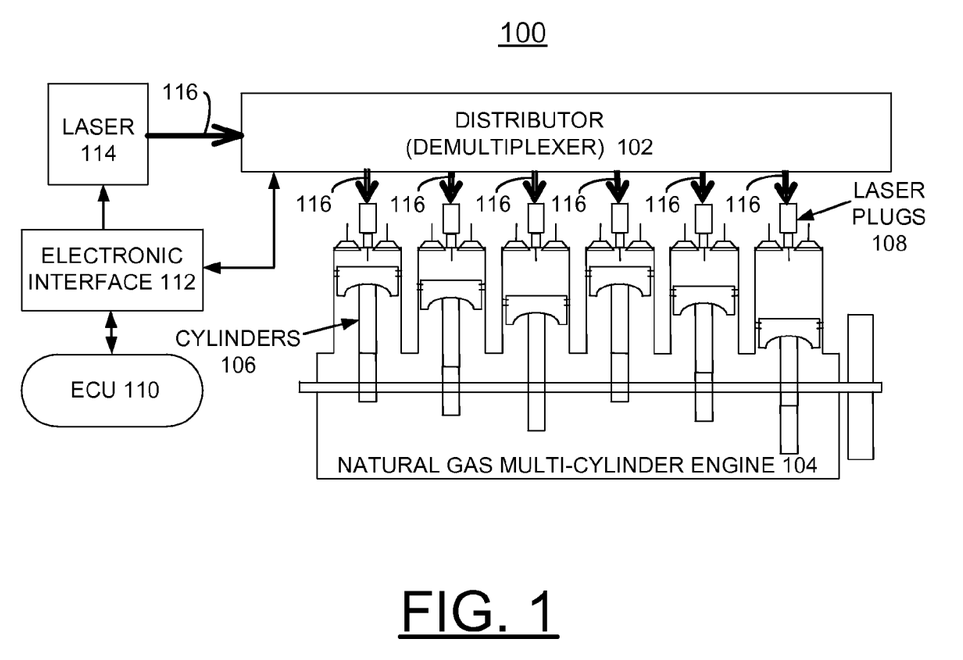
FIG. 1 is a schematic diagram illustrating an exemplary laser pulse distribution system in accordance with the preferred embodiment.

Having reference now to the drawings, FIG. 1 illustrates an exemplary laser pulse distribution system generally designated by reference character 100 in accordance with the preferred embodiment. Laser pulse distribution system 100 includes a distributor 102 coupled to a multi-cylinder engine 104. The distributor 102 implements a laser output pulse demultiplexing method in accordance with the preferred embodiment.

In accordance with features of the invention, the distributor 102 distributes high-power laser pulses to create sparks in each of a plurality of individual cylinders 106 of the multi-cylinder engine 104. The distributor distributes individual laser output pulses to each of a plurality of laser plugs 108 for providing spark generation. A respective laser plug 108 of the plurality of laser plugs 108 is installed in a respective individual cylinder 106.

An electronic control unit (ECU) 110 is provided to obtain the correct spark timing with crankshaft orientation. An electronic interface 112 coupled to the electronic control unit (ECU) 110 provides control signals to the distributor 102 for enabling correct spark timing.

A single laser 114 provides laser output pulses to the distributor 102. The pulsed laser beam output of laser 114 is demultiplexed, i.e., spatially separated, by distributor 102, and the individual laser output pulses indicated by lines 116 are routed to laser plugs 108 installed in individual cylinders 106 for subsequent focusing resulting in spark generation.

Figure 2:
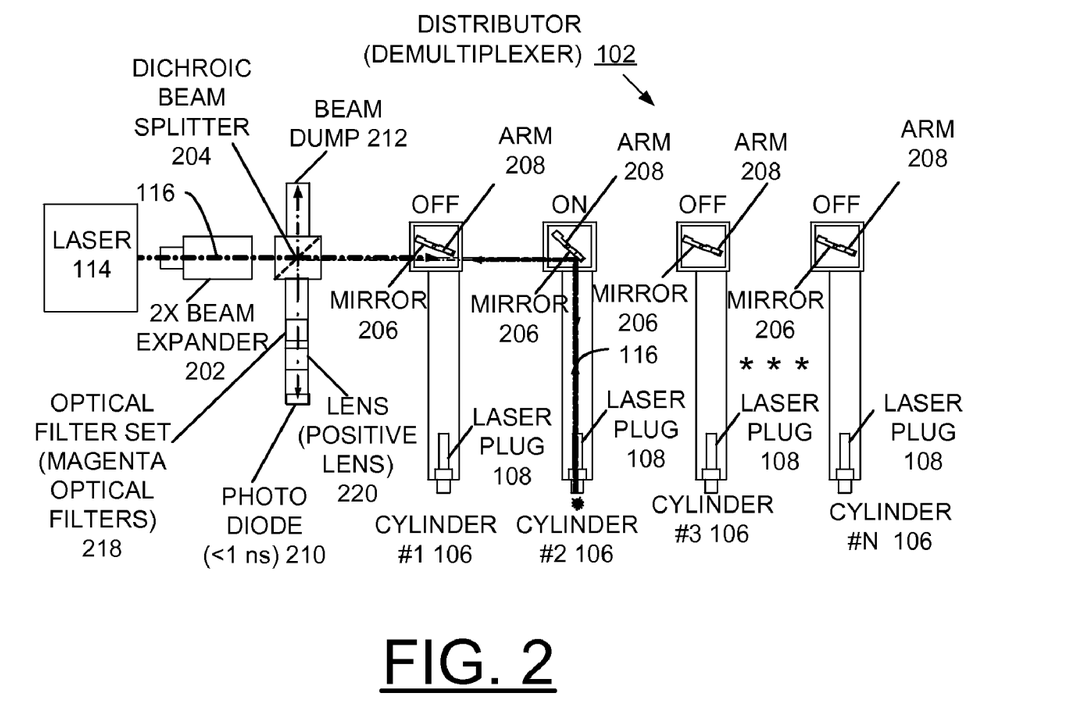
FIG. 2 is a schematic diagram illustrating an exemplary distributor for implementing a laser output pulse demultiplexing method in the laser pulse distribution system of FIG. 1 in accordance with the preferred embodiment.

Referring also to FIG. 2, there is shown an exemplary distributor 102 in accordance with the preferred embodiment. The pulsed output emission from the laser 114 indicated at dashed line 116 is passed through a 2× beam expander 202 to a planar dichroic beam splitter 204 placed at 45 degrees to the laser beam. The distributor 102 spatially separates a train of high-power laser pulses using a linear array of mirrors 206. The distributor 102 spatially separates a train of high-power laser pulses using a linear array of mirrors 206. The distributor 102 includes the linear array of mirrors 206 with a respective mirror 206 associated with one of the laser plugs 108. Each of the mirrors 206 is held by an arm 208 and is operatively controlled to direct individual laser output pulses indicated by the dashed laser beam line 116 to the associated laser plug 108.

The dichroic beam splitter 204 is such that it transmits the laser radiation while it reflects radiation at all other wavelengths. A significant portion of the white light that results due to spark creation is collected by the sapphire lens (not shown) of the laser plug 108 and is collimated. The collimated beam in turn is routed by the mirror 206 and dichroic beam splitter 204 onto a short (<1 ns) response photo diode 210. A beam dump 212 is coupled to the dichroic beam splitter 204.

Photo diode 210 is provided to implement an optical scheme that enables monitoring and distinguishing between the events of (i) laser pulse incidence in individual cylinders, (ii) successful/unsuccessful spark creation following laser incidence and (iii) successful/unsuccessful ignition, i.e., combustion of the cylinder charge following spark creation.

To improve the detection efficiency of the photo diode 210 to spark emission while minimizing the response to residual laser emission, the collimated beam is routed through a set of magenta optical filters 218 and a positive lens 220. Alternately, the feedback signals can also be obtained by using a fiber optic end placed in each of the cylinders 106 with a field of view covering the spark and some combustion volume and using appropriate optical detectors.

It should be understood that the present invention is not limited to the use of the set of magenta optical filters 218 and positive lens 220. Other optical filters can be used that are appropriate for the wavelength of laser 114.

Figure 4A:
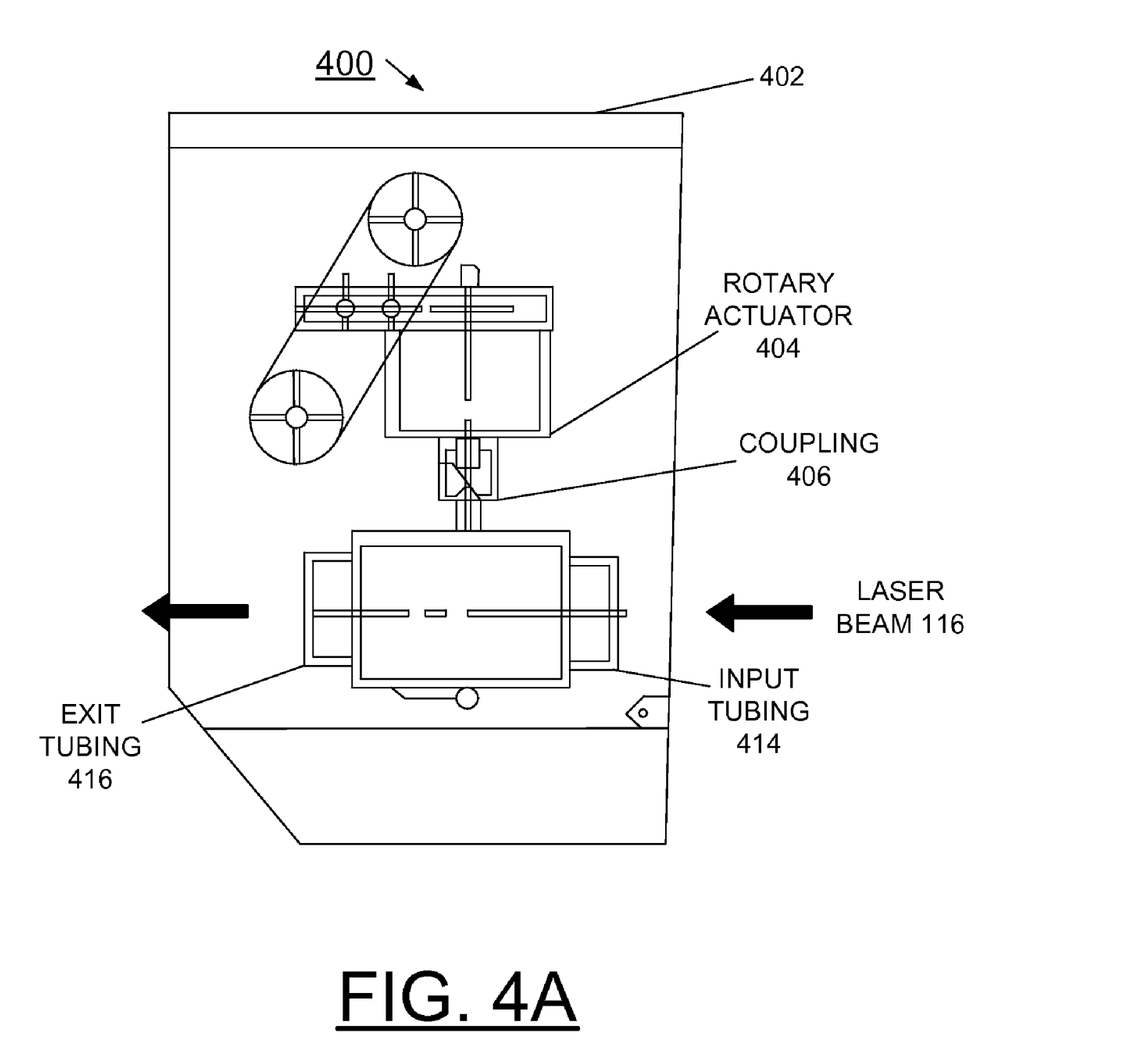
FIGS. 4A and 4B are schematic diagrams not to scale together illustrating an exemplary modular design of one channel of the exemplary distributor of FIG. 2 for implementing the laser output pulse demultiplexing method in the laser pulse distribution system of FIG. 1 in accordance with the preferred embodiment.
Figure 4B:
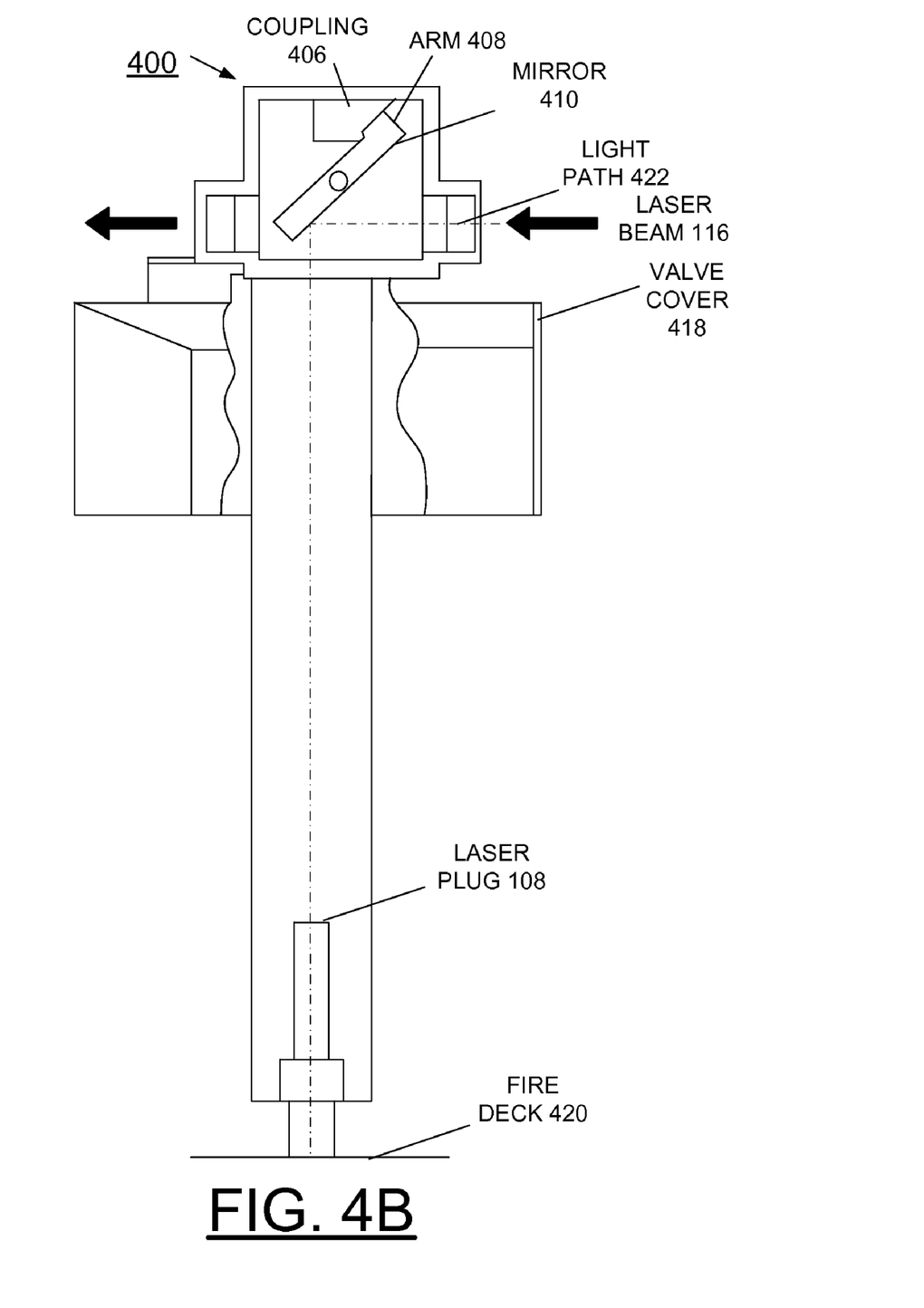

In the OFF state the mirrors 206 are out of the path of the laser beam. When a particular mirror 206 is activated or located in ON state, the mirror 206 moves into the path of the laser beam to deflect the beam by approximately 90 degrees, so as to be incident on a laser plug 108 installed in a cylinder head 402 as shown in FIGS. 4A and 4B.

As shown in FIG. 2, the demultiplexed laser pulses indicated at dashed line 116 are subsequently transmitted through air to the laser plug 108, while it should be understood that the demultiplexed laser pulses can also be transmitted via optical fibers using an appropriate fiber injection scheme.

In accordance with features of the invention, the distributor 102 is cost effective, durable and capable of handling laser fluencies in excess of $MW/cm^2$. The single laser 114 is a high power pulsed laser, such as a Q-switched Nd:YAG laser or a diode pumped solid state (DPSS) laser. The laser wavelength can be fundamental or a harmonics of fundamental wavelength.

The laser plugs 108 have stainless steel housings, encasing a quartz or a sapphire insert that acts as lens. These laser plugs 102 focus the laser output pulses from the high power pulsed laser 114 to a tiny volume. The high electric field gradient at the focal spot leads to photoionization of the combustible mixture resulting in ignition.

A laser ignition plug of the type described in the above-identified U.S. Pat. No. 7,114,858 advantageously implements the laser plug 108. The subject matter of the above-identified U.S. Pat. No. 7,114,858 is incorporated herein by reference.

Figure 3:
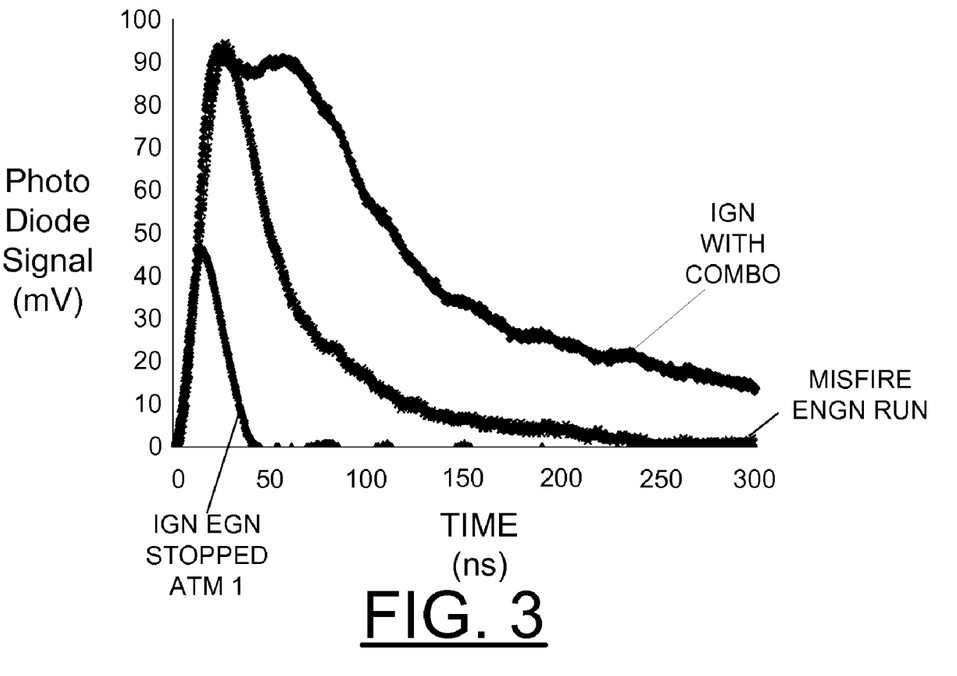
FIG. 3 is a chart illustrating exemplary detected signals from a photo diode in the exemplary distributor of FIG. 2 of the laser pulse distribution system of FIG. 1 in accordance with the preferred embodiment.

FIG. 3 is a chart illustrating exemplary detected signals from the photo diode 210 in the exemplary distributor 102 of FIG. 2 of the laser pulse distribution system 100 of FIG. 1 in accordance with the preferred embodiment. The spark intensity achieved when the engine was stopped and the cylinder-contained air at 1 atmosphere (Atm) gives a peak response of 47 mV, indicated at a line IGN EGN STOPPED ATM 1. Similar signal during engine operation with sparking achieved at pressures >10 bar has approximately twice the magnitude and further shows a second peak that results from chemiluminescence due to combustion, indicated at a line IGN WITH COMBO. Similar signal when sparking is achieved but does not result in a successful combustion does not exhibit the second peak, indicated at a line MISFIRE ENGN RUN. Using appropriate electronics, for example, provided with ECU 110 such as peak stretchers, sample and hold circuits, voltage comparators, and the like, such photo diode detected signals are manipulated to monitor and distinguish between the events of (i) laser pulse incidence in individual cylinders, (ii) successful/unsuccessful spark creation following laser incidence and (iii) successful/unsuccessful ignition, i.e., combustion of the cylinder charge following spark creation.

Referring to FIGS. 4A and 4B, there is shown an exemplary modular design generally designated by reference character 400 of one channel of the exemplary distributor 102 of FIG. 2 for implementing laser output pulse demultiplexing method in the laser pulse distribution system 100 of FIG. 1 in accordance with the preferred embodiment. A base support 402 contains a rotary actuator 404 provided with a coupling 406, shown in FIG. 4A. The coupling 406 is arranged for controlling an arm 408 carrying a mirror 410, shown in FIG. 4B. A laser beam indicated by lines 116 enters at input tubing 414 and exits at exit tubing 416. In FIG. 4B, the laser beam at lines 116 is shown located above a valve cover 418 with a fire deck 402 illustrated below the laser plug 108 within the illustrated channel. A light path 422 is illustrated in dotted line with the mirror 410 moved to deflect the laser beam 116 to the laser plug 108.

Figure 5:
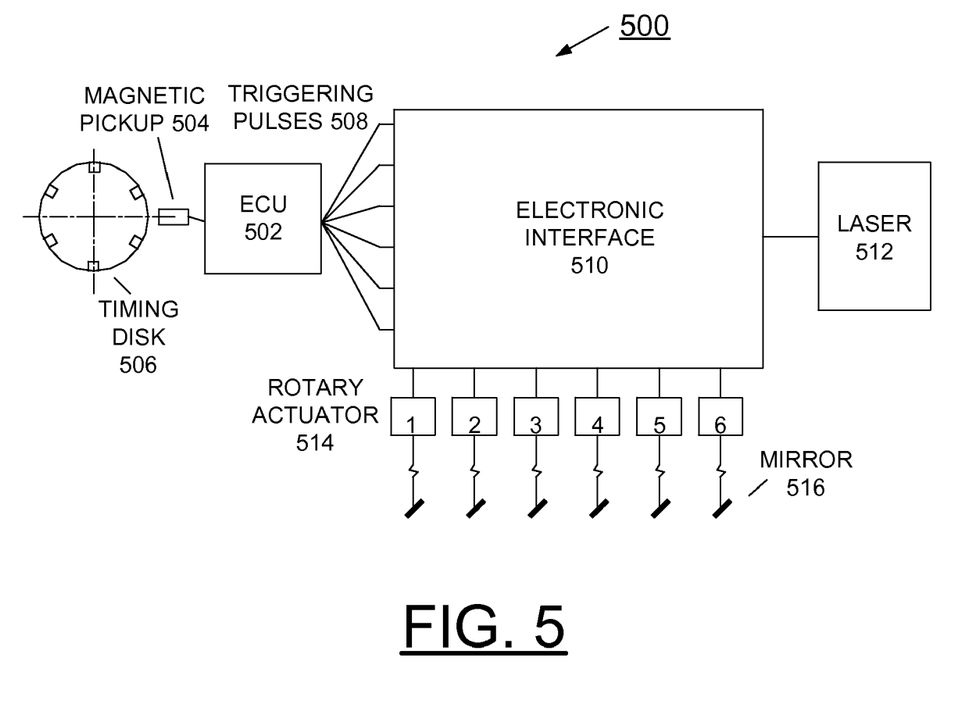
FIG. 5 is a schematic diagram illustrating an exemplary control arrangement of the exemplary distributor of FIG. 2 for implementing the laser output pulse demultiplexing method in the laser pulse distribution system of FIG. 1 in accordance with the preferred embodiment.

FIG. 5 illustrates an exemplary control arrangement generally designated by reference character 500 of the exemplary distributor of FIG. 2 for implementing laser output pulse demultiplexing method in the laser pulse distribution system of FIG. 1 in accordance with the preferred embodiment. Control system 500 includes an electronic control unit (ECU) 502 receiving an output signal from a magnetic pickup 504 coupled to a timing disk 506. ECU 502 provides triggering pulses 508 to an electronic interface 510 coupled to a single laser 512 providing laser output pulses to the distributor 102, shown in FIGS. 1 and 2, and a plurality of rotary actuators 514. Each respective rotary actuator 514 is coupled to a mirror 516 and is operatively controlled by the electronic interface 510.

A prototype for the distributor 102 with the control arrangement 500 for deployment on a typical 6-cylinder 4-stroke natural gas engine has been designed and tested. For a typical 6-cylinder 4-stroke natural gas engine operating at 1800 rpm, to avoid interference between individual channels each of the mirror arrangements needs to have a time response smaller that 11 ms. The laser pulse emission occurs after the mirror has moved into position. The hardware arrangement achieved in the prototype exhibited ~7 ms response time, making the laser pulse distribution system 100 ideal for engine applications. The results from a 7-hour segment of a 24-hour durability test at 1500-rpm engine speed equivalent included no misfires during this test duration.

This prototype described here can be scaled up to accommodate engines larger than the 6 cylinder engine by appropriate choice of laser and other components or implementing the system 100 of the invention in several segments that involves more than one laser and required laser beam redirection optics and assemblies.

In summary, the high-power laser beam demultiplexing method of the invention is durable, cost-effective and allows timing variation of individual cylinders. This is ideally suited for laser ignition in a multi-cylinder engine while using fiber optic delivery or relying on free-space beam delivery. Also, by minimizing the optical surfaces and the ensuing losses, laser power demands on the laser are kept to a minimum. Such a system also features an optical scheme to monitor spark generation, and whether it results in subsequent combustion.

While the present invention has been described with reference to the details of the embodiments of the invention shown in the drawing, these details are not intended to limit the scope of the invention as claimed in the appended claims.

What is claimed is:

1. A system for distributing high-power laser pulses to create sparks in individual cylinders of a multi-cylinder engine comprising:
    a laser providing laser output pulses;
    a plurality of laser plugs; each laser plug of the plurality of laser plugs being installed in a respective individual cylinder of the multi-cylinder engine;
    a distributor distributing individual laser output pulses to said plurality of laser plugs for providing spark generation;
    an electronic control unit (ECU) providing control signals to said distributor for enabling correct spark timing;
    said distributor including a linear array of mirrors with a respective mirror associated with one of said plurality of laser plugs; each of said mirrors being held by an arm connected to a rotary actuator; said rotary actuator being operatively controlled to selectively direct individual laser output pulses to said associated laser plug with each respective mirror being operatively controlled to selectively direct individual laser output pulses to said associated laser plug.

2. The system for distributing high-power laser pulses to create sparks in individual cylinders of a multi-cylinder engine as recited in claim 1 includes a beam expander coupling said laser output pulses to said plurality of laser plugs.

3. The system for distributing high-power laser pulses to create sparks in individual cylinders of a multi-cylinder engine as recited in claim 1 includes a dichroic beam splitter positioned in the laser beam to transmit the laser radiation while it reflects radiation at substantially all other wavelengths.

4. The system for distributing high-power laser pulses to create sparks in individual cylinders of a multi-cylinder engine as recited in claim 1 wherein said distributor is capable of handling laser fluencies greater than 1 $MW/cm^2$.

5. The system for distributing high-power laser pulses to create sparks in individual cylinders of a multi-cylinder engine as recited in claim 1 wherein said distributor is substantially vibration insensitive.

6. The system for distributing high-power laser pulses to create sparks in individual cylinders of a multi-cylinder engine as recited in claim 1 wherein said distributor has a time response smaller than 7 ms.

7. The system for distributing high-power laser pulses to create sparks in individual cylinders of a multi-cylinder engine as recited in claim 1 wherein said mirrors are positioned out of a laser beam path in the OFF state.

8. The system for distributing high-power laser pulses to create sparks in individual cylinders of a multi-cylinder engine as recited in claim 1 wherein a selected one of said mirrors is positioned in the laser beam path in the ON state; said selected mirror deflecting said laser output pulses to said associated laser plug.

9. The system for distributing high-power laser pulses to create sparks in individual cylinders of a multi-cylinder engine as recited in claim 1 includes a short response photo diode for detecting an ignition event.

10. The system for distributing high-power laser pulses to create sparks in individual cylinders of a multi-cylinder engine as recited in claim 9 wherein includes a set of optical filters and a positive lens coupled to said photo diode.

11. The system for distributing high-power laser pulses to create sparks in individual cylinders of a multi-cylinder engine as recited in claim 1 wherein said electronic control unit (ECU) providing control signals to said distributor for enabling correct spark timing provides a predefined multi-cylinder firing sequence.

12. The system for distributing high-power laser pulses to create sparks in individual cylinders of a multi-cylinder engine as recited in claim 11 wherein said predefined multi-cylinder firing sequence includes a non-sequential order of the individual cylinders of the multi-cylinder engine.

13. The system for distributing high-power laser pulses to create sparks in individual cylinders of a multi-cylinder engine as recited in claim 1 wherein said electronic control unit (ECU) providing control signals to said distributor for enabling correct spark timing enables individually adjust spark timing in the individual cylinders.

14. The system for distributing high-power laser pulses to create sparks in individual cylinders of a multi-cylinder engine as recited in claim 13 includes individually adjusting spark timing in each of the individual cylinders by ±6 crank angle degrees.

15. The system for distributing high-power laser pulses to create sparks in individual cylinders of a multi-cylinder engine as recited in claim 13 includes a magnetic pickup coupled to a timing disk, said magnetic pickup providing an output signal to said electronic control unit (ECU).

16. The system for distributing high-power laser pulses to create sparks in individual cylinders of a multi-cylinder engine as recited in claim 1 wherein said laser including a high power pulsed laser.

17. A method for distributing high-power laser pulses to create sparks in individual cylinders of a multi-cylinder engine comprising the steps of:
   providing a laser providing laser output pulses;
   providing a respective laser plug installed in each of the individual cylinders of the multi-cylinder engine;
   providing a distributor distributing individual laser output pulses to said plurality of laser plugs for providing spark generation; said distributor including a linear array of mirrors with a respective mirror associated with one of said plurality of laser plugs;
   providing a rotary actuator with each of mirrors being held by an arm connected to said rotary actuator; said rotary actuator being operatively controlled to selectively direct individual laser output pulses to said associated laser plug;
   providing control signals to said distributor for enabling correct spark timing;
   operatively controlling said rotary actuator to selectively direct individual laser output pulses to said associated laser plug with each respective mirror being operatively controlled to selectively direct individual laser output pulses to said associated laser plug.

18. The method for distributing high-power laser pulses to create sparks in individual cylinders of a multi-cylinder engine as recited in claim 17 includes providing a short response photo diode for detecting an ignition event.

19. The method for distributing high-power laser pulses to create sparks in individual cylinders of a multi-cylinder engine as recited in claim 17 includes providing electronic control unit (ECU) for providing control signals to said distributor and providing a magnetic pickup coupled to a timing disk, said magnetic pickup providing an output signal to said electronic control unit (ECU).

* * * * *